March 31, 1959   P. P. DEMAY   2,879,971
VALVE APPARATUS
Filed Oct. 20, 1954
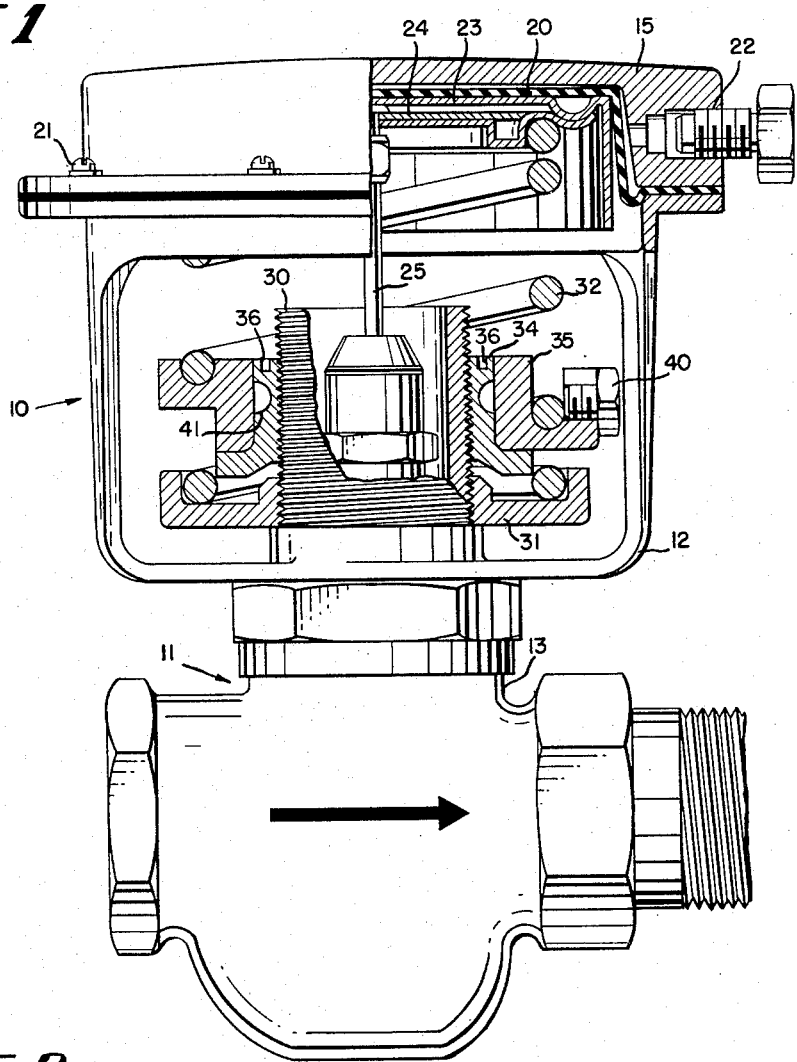
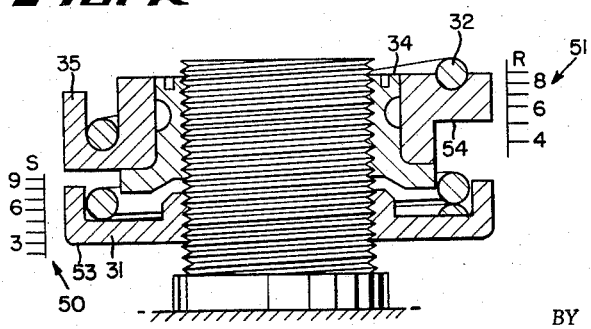
INVENTOR
PETER P. DEMAY
BY George H Fisher
ATTORNEY

United States Patent Office 2,879,971
Patented Mar. 31, 1959

2,879,971

VALVE APPARATUS

Peter P. Demay, Chicago, Ill., assignor to Minneapolis-Honeywell Regulator Company, Minneapolis, Minn., a corporation of Delaware Application October 20, 1954, Serial No. 463,523

5 Claims. (Cl. 251—61)

The present invention is concerned with an improved valve apparatus, in particular, apparatus for changing the effective spring rate of a spring in the valve actuator.

While spring rate changers are broadly old there has been a need for a simple method of adjusting the spring rate of springs used in valve actuators. In pressure operated valves the pressure at which the valve begins to open and the range of pressure through which the valve opens are important for the proper operation of conditioning control systems containing such valves. The starting pressure can be adjusted in a conventional valve by varying the initial loading on the valve spring; however, it has been the common practice to provide a selection of springs for such valve actuators so that different ranges of operation are obtainable. This requires that the valves with various operating ranges be individually stocked as springs are not readily changeable in the field.

In the valve actuator of the present invention the valve begins to open upon a predetermined air pressure being applied to the diaphragm operator as normally selected by the initial loading on the spring and a selected portion of the spring is adjustably attached to a support so that a number of turns or portion of a turn is rendered inactive. The effective spring rate of the spring in the valve actuator is thus changeable. This provides for a range selection so that the complete operation of the valve takes place over a predetermined pressure range.

The needed flexibility in the field in a particular installation requires valves with various ranges and once a particular valve is installed it is not necessary to replace the operating head for any range variation.

The present invention makes it possible to manufacture and stock one valve operating head that is adaptable for operating numerous sizes of valves and provides for starting and range adjustment of the valve in the field as installed.

An object of the present invention is to provide in a valve actuator an improved spring rate adjustment so that the operating range of the valve can be easily adjusted.

A still further object of the present invention is to provide an improved spring rate changer in which a portion of the spring is rendered inactive without disturbing the initial loading of the spring.

Other objects of the present invention will become apparent in a reading of the following specification and associated drawing of which;

Figure 1 shows a side cut-away view of the valve actuator mounted on a valve.

Figure 2 shows a method of calibration for the valve actuator.

Referring to the figure, a valve actuator or operating head 10 is attached to a valve 11 of any conventional type having a seat and a closure member (not shown) that is positioned by the valve actuator. Such a valve is often used in a conventional heating system, for example, to control the flow of steam. The valve actuator comprises a base member 12 connected to a valve body 13 by a suitable connection. Attached to the upper end of the base member is a cap 15. Cap 15 has a cup shape for receiving a diaphragm 20 in its inner cavity, the diaphragm having its outer edge held between the mating peripheries of the cup member between the cap 15 and base 12 which are held together by a series of screws 21. Cap 15 contains a suitable port 22 for receiving a fitting of a conduit that is connected to a pressure supply source through suitable control apparatus (not shown) so that upon the application of pressure from the supply air is forced into the space between diaphragm 20 and the cap 15 to move the diaphragm downward against a suitable backing plate 23 which cooperates with a disc 24 that is connected by a stem 25 to the valve closure member (not shown).

Surrounding shaft 25 and integral with base member 12 is a threaded sleeve 30 for holding a first adjustable flange-like support member 31 whose position can be adjusted up and down by turning the flange about sleeve 30 so that it advances on the threaded connection. A coil or helix type spring 32 circumventing shaft 25 is mounted between support disc 24 and adjustable support member 31 thereby urging member 23, as well as diaphragm 20, upward into the cavity of cap 15. The spring loading, thus the upward force on member 23, is adjustable by vertically positioning support 31. With conventional right-hand threads, a clockwise (looking from the bottom of the valve upward) rotation of flange 31 would advance it upward on sleeve 30 to load spring 32.

A second adjustable support member 34 is also threaded on sleeve 30 in a manner similar to member 31. Cooperating with support 34 is a member 35 having a groove for receiving a portion of spring 32, the groove having a slope substantially the same as the pitch of the coil spring. Member 35 is associated with support 34 and upon advancing member 35 to a predetermined position where it is locked to the spring by a set screw 40, member 34 is advanced on the threaded portion of sleeve 30 to move it upward to engage member 35 and therefore support it in a positive manner. The adjustable support 34 may be moved by the use of a suitable wrench having pins for engaging holes 36 or by other suitable means. Once support 34 is in a position to hold member 35, a set screw (not shown) through member 35 at right angles to shaft 25 is received in a notch 41 in support member 34.

In order to calibrate the valve actuator a suitable manner of marking is used as shown in Figure 2. A "start" scale 50 and a "rate" scale 51 are placed on base member 12. To calibrate, member 31 is first moved to its lowest position where an edge 53 of member 31 coincides with mark "2" on scale 50. Member 35 is then advanced on spring 32, rendering a portion thereof inactive, until an edge 54 of member 35 coincides with the selected mark on scale 51. Set screw 40 is then set to fasten member 35 to the spring. As shown, a rate of 5 pounds per square inch is selected, this being the pressure range necessary to operate actuator 10 from a closed valve position to full open. Thereafter, the starting pressure is adjusted and member 31 is moved upward to a selected position, as shown the starting pressure is 3 p.s.i. Thereafter member 34 is advanced upward until it engages member 35 in a supporting manner so that only the portion of the spring above member 35 is active. Thus the valve actuator begins to close the valve when a pressure of 8 p.s.i. is supplied to port 22 and is fully closed at 17 p.s.i.

In the operation of a valve of this type, the system requirements often determine what pressure applied to port 22 should begin to open the valve and what range of pressures would cause operation of the valve from one extreme to the other. The starting pressure of course depends upon the initial loading of the spring and the range of operation of the valve depends upon the spring rate or force versus displacement characteristic of the spring. While it is possible to use a particular spring for a particular installation, the spring having an initial load and spring rate, it is advantageous to provide a valve actuator that can be adjusted in the field. The system requirements can thus be readily met, thereby preventing the necessity of having several different valve actuators in stock. This also eliminates the needs of changing springs of valve actuators in the field, the latter being quite impractical since springs of the type shown at 32 are quite heavy and special equipment is needed to install them in such valve actuators.

The actuator 10 can be readily made in mass production and attached to various valves depending on the flow capacities needed. When the valve unit is delivered to the field the range of operation of the valve is adjusted by changing the spring rate. With set screw 40 loosened, member 35 is advanced by rotating it about sleeve 30 to a selected mark on scale 51 indicating the range that will be obtained if the member is locked to the spring in that position, this being done with member 31 against base 12. Set screw 40 is then locked and the starting pressure is adjusted by raising member 31 to a selected mark on scale 50. Support member 34 is then advanced upward to engage member 35 at which time the set screw in member 35 is tightened to be received in notch 41. The spring now has a portion of its lower end rendered inactive which changes its force versus displacement characteristic so that more pressure change in the chamber above diaphragm 20 is necessary to move the valve closure member the length of its stroke than would have been the case if all of the spring 32 were active.

While the spring rate adjustment is shown and described in a valve actuator it is believed that the invention should be only limited by the scope of the appended claims.

I claim:

1. In combination, a valve comprising a housing, pressure responsive means in said housing comprising a flexible member forming one side of a chamber adapted to receive pressure from a source, a support member cooperating with said flexible member on the side opposite said chamber, said support member adapted to operate said associated valve, a base on said housing, first supporting means adjustably connected to said base, a coil spring, said spring being mounted between said support member and said first supporting means whereby the initial loading of said spring is changed by the adjustment of said first supporting means with respect to said base, second supporting means adjustably connected to said base, said first and second supporting means being independently adjusted, and a member having a recess thereon for receiving a portion of said spring immediate the ends thereof, said last mentioned member being supported by said second supporting means whereby an end portion of said spring between said last mentioned member and said first supporting means is rendered ineffective so that the effective spring rate of said spring is changed and thus the pressure range required for complete operation of the valve.

2. In combination, a valve having a housing, pressure responsive means mounted on said housing comprising a flexible diaphragm forming one side of a chamber to which fluid under pressure is supplied, supporting means contacting said diaphragm on the side opposite said chamber, means connecting said supporting means to said valve so that movement of said diaphragm and thus the operation of said valve depends upon the pressure in said chamber, a base member, loading means mounted on said valve housing for said diaphragm comprising a coil spring mounted between said supporting means and said base member, said base member being adjustable for preloading said spring so that a predetermined fluid pressure is required to initiate operation of said valve, and further means associated with said base member and an intermediate portion of said spring and being independently adjusted for rendering a portion of said spring ineffective thereby changing the overall spring rate of said spring so that the force requirement versus movement of said supporting means is variable.

3. In combination, a valve having a housing, pressure operated means, connection means connecting said pressure operated means in a manner to operate said valve, resilient means for loading said pressure operated means, a base member on said housing, said resilient means being mounted between said base member and said pressure operated means, support means selectively attachable to an intermediate portion of said resilient means between said pressure operated means and said base member, the position of attachment depending upon the ultimate desired rate of said resilient means, means adjustably mounted on said housing for changing the initial loading on said pressure operated means by moving one extremity of said resilient means associated with said base member, and means for connecting said support means to said base member in its new position established upon movement of said one extremity, whereby the initial loading of said resilient means is set and the rate of change in loading, as said pressure operated means is moved, is selected.

4. In combination, a valve comprising a housing, a spring operatively connected to said valve, valve operating means operatively connected with said spring, means to be loaded by said spring to change the operating characteristics of the valve, a base member on said housing, first support means adjustably associated with said base member, said spring being mounted between said support member and said first mentioned means so that the initial loading can be selected by said support member, second support means adjustably associated with said base member, means for connecting said second support means to said spring intermediate said support member and said first mentioned means to render a portion of it inactive and thereby change said spring rate.

5. In combination, a valve comprising a housing, resilient means, a base member on said housing, pressure operated means for operating said valve, first adjustable support means associated with said base member for receiving one end of said resilient means, means connecting the other end of said resilient means to said pressure operated means, a flange member having a recess for receiving a portion of said resilient means, said flange member being adjusted on said resilient means to select the desired rate of said resilient means, means for connecting said flange member rigidly to said resilient means intermediate said pressure operated means and said first adjustable support means, said first adjustable support means thereafter being adjusted to select a desired initial loading of said resilient means, and second adjustable support means associated with said base member, said second adjustable support means being adjusted to support said flange means thereby selectively rendering a portion of said resilient means ineffective.

References Cited in the file of this patent

UNITED STATES PATENTS

| | | |
|---|---|---|
| 571,833 | Hunter | Nov. 24, 1896 |
| 978,026 | Jaenichen | Dec. 6, 1910 |
| 1,953,664 | Walker | Apr. 3, 1934 |
| 2,338,761 | Draper | Jan. 11, 1944 |
| 2,585,362 | Willson | Feb. 12, 1952 |
| 2,629,538 | Replogle | Feb. 24, 1953 |